(12) United States Patent
Vobian (10) Patent No.: US 6,640,035 B2
(45) Date of Patent: *Oct. 28, 2003

(54) DISPERSION COMPENSATION FIBER (75) Inventor: Joachim Vobian, Mühltal (DE)

(73) Assignee: Deutsche Telekom AG, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,649

(22) PCT Filed: Sep. 13, 1997

(86) PCT No.: PCT/EP97/05022

§ 371 (c)(1),
(2), (4) Date: Jul. 2, 1999

(87) PCT Pub. No.: WO98/14806

PCT Pub. Date: Apr. 9, 1998

(65) Prior Publication Data

US 2002/0015569 A1 Feb. 7, 2002

(30) Foreign Application Priority Data

Sep. 30, 1996 (DE) .......................... 196 41 577

(51) Int. Cl.[7] .................................. G02B 6/02
(52) U.S. Cl. ........................... 385/123; 385/11
(58) Field of Search .................. 385/123, 125, 385/11; 65/385, 403

(56) References Cited

U.S. PATENT DOCUMENTS 5,261,016 A * 11/1993 Poole .......................... 385/28
5,371,815 A * 12/1994 Poole .......................... 385/11
5,450,427 A   9/1995 Fermann et al. ............. 372/10
5,482,525 A *  1/1996 Kajioka et al. .............. 65/398

OTHER PUBLICATIONS

Nakano et al., "Dispersion–Compensator Incorporated Optical Fiber Amplifier,"IEEE Photonics Technolgy Letters, Bd. 7, Nr. 6, Jun. 1, 1995.
Fermann et al., "Generation of Pulses Shorter than 200 FS from a Passively Mode–Locked ER Fiber Laser," Optics Letters, Bd. 18, Nr. 1, Jan. 1, 1993.Pataca et al., "Actively Modelocked PR3+–Doped Fluoride Fibre Laser," Electronics Letters, Bd. 30, Nr. 12, Jun. 9, 1994 Mentioned in specification.
Poole et al., "Elliptical–Core Dual–Mode Fiber Dispersion Compensator," IEEE Photonics Techology Letters, Bd. 5, Nr. 2, Feb. 1, 1993.
Youwei et al., "Triple–Clad Single–Mode Fibers for Dispersion Flattening," Optical Engineering, Bd. 33, Nr. 12, Dec. 1, 1994.

(List continued on next page.)

Primary Examiner—Thong Nguyen
Assistant Examiner—Arnel C. Lavarias
(74) Attorney, Agent, or Firm—Kenyon & Kenyon (57) ABSTRACT

The phase modulator in the laser resonator requires both at the input and at the output defined linearly polarized light which has to be generated. Hitherto, this was bought about in a complex and expensive manner using polarization actuators. The invention provides a combination of dispersion compensation and definition of the linear polarization state in a dispersion compensation fiber (PM-DC fiber) which is birefringent at such a high level that only the two orthogonal linear polarization states can be diffused therein. The invention can be used for mode-locked fiber lasers in which the time pulse width has to be as small as possible.

1 Claim, 10 Drawing Sheets

Core geometry of the W profile fiber (elliptical fit)
large axis: 2.48 μm
small axis: 1.54 μm

OTHER PUBLICATIONS

Kuizenga et al., "FM and AM Mode Locking of the Homogeneous Laser–Part I: Theory," IEEE J. Quant. Electr. 6 (1970), p. 694 with the supplement by G. Geister, "Integrierte optische Modulation von Nd–Faserlasern," [Integrated optical modulation of Nd fiber lasers] etc. Mentioned in specification.

Boness et al., "Tailoring of dispersion–compensation fibers with high compensation ratios up to 30," Pure Appl. Opt. 5 (1995) 333 Mentioned in specification.

Vengsarkar et al., "Fundamental–mode dispersion–compensating fibers: design considerations and experiments," OFC '94. Optical Fiber Communication, vol. 4 Technical Digest Series Mentioned in specification.

Gisin et al., Polarization Mode Dispersion of Short and Long Single–Mode Fibers, J. Lightw. Technol. 9 (1991) 7, p. 821*.

Vobian et al., Different aspects of the polarization mode dispersion measuring technique, Proc. EFOG&N 94, Heidelberg 1994, p. 174 Mentioned in specification.

* cited by examiner

Figure 1: Structure of a Pr³⁺ doped fluoride glass fiber laser with two PM-DC fibers Figure 2: Measured (x) and calculated (—) pulse half-width with and without (- - -) taking into account dispersion as a function of modulation frequency Figure 3: n(r) profile of the stepped index fiber 79M Figure 4: n(r) profile of the W-profile fiber 82M

Refractive index profile of the two TC profile fibers with a rectangular core (top) and with a parabolic core (bottom), preform measurement Figure 6: Core geometry of the W profile fiber (elliptical fit)
large axis: 2.48 µm
small axis: 1.54 µm

Group transit time curve and dispersion curve for the stepped index fiber

Figure 8: Chromatic dispersion of the W profile fiber 82M (Raman fiber laser measurement)

Dispersion curves of the two TC-profile fibers 94M and 96M with a rectangular core (top) and with a parabolic (bottom)

Figure 10: Double-pulse diagram on the oscilloscope screen; stepped index fiber, fiber length 615 m, λ = 1550 nm, pulse interval 1679 ps → PMD = 2.63 ps/m

DISPERSION COMPENSATION FIBER

FIELD OF THE INVENTION

The present invention relates to dispersion compensation fibers for compensation of dispersion in glass fiber

BACKGROUND INFORMATION

Dispersion comensation fibers are described, for example, by D. M. Pataca, M. L. Rocha, K. Smith, T. J. Whitley, R. Wyatt in "Actively modelocked $Pr^{3+}$-doped fluoride fibre laser" *Electr. Lett.*, 30 (1994) 2, p. 964.

Figure 1:
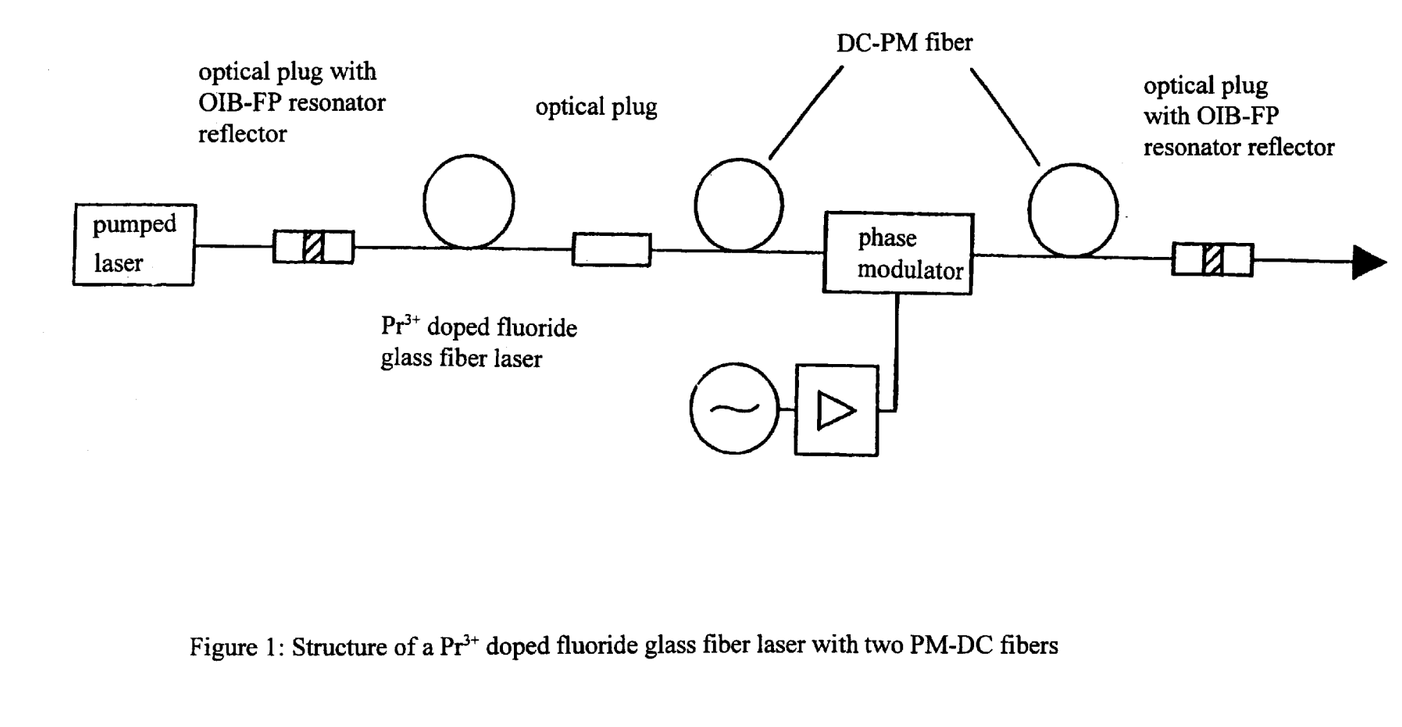
FIG. 1: the structure of a $Pr^{3+}$ doped fluoride glass fiber laser with two PM-DC fibers.

The use and design of such dispersion compensation fibers (DC fibers) for compensation of the dispersion of the active fibers of the fiber laser with a fiber laser structure such as that presented in FIG. 1, for example, is already known. The phase modulator in the laser resonator requires both at the input and at the output defined linear polarized light which must be produced. Previously, this has been achieved using polarization convertors, which is generally complex and laborious.

As the radiation source of ultra-high bit rate transmission systems and as a source of solitons, modelocked fiber lasers are used to advantage. The most important prerequisite is that the pulse width over time must be as small as possible, i.e., it must not exceed a few ps. Various authors, such as D. M. Pataca, M. L. Rocha, K. Smith, T. J. Whitley, R. Wyatt: "Actively modelocked $Pr^{3+}$-doped fluoride fibre laser" *Electr. Lett.*, 30 (1994) 2, p. 964, have demonstrated that the chromatic dispersion of the active fibers of the fiber laser has a pulse widening effect. The formulas by D. J. Kuizenga, A. E. Siegman: "FM and AM Mode Locking of the Homogeneous Laser—Part I: Theory." *IEEE J. Quant. Electr.* 6 (1970), p. 694 with the supplement by G. Geister: "Integrierte optische Modulation von Nd-Faserlasem" [Integrated optical modulation of Nd fiber lasers] *Fortschrittsberichte VDI Reihe* [VDI Progress Reports Series] 10 (1990) 140, 1, 102 describe the dependence of pulse half-width $\tau_p$ over time on modulation frequency $f_m$, modulation index $\delta_c$, laser wavelength $\lambda$, length of active fiber $L_a$, gain coefficient g and spectral half-width $\Delta\lambda$ of the fluorescence spectrum:

$$\tau_p = \frac{\sqrt{2\sqrt{2}\ln 2}}{\pi}\left[\frac{1}{f_m^2\delta_c}\right]^{1/4}\left[\left(\frac{\lambda^2 L_a}{2\pi c}D\right)^2 + \left(\frac{g}{\pi^2\Delta f^2}\right)^2\right]^{1/8}$$

The extension by Geister is expressed by the additional term with D, taking into account chromatic dispersion.

Figure 2:
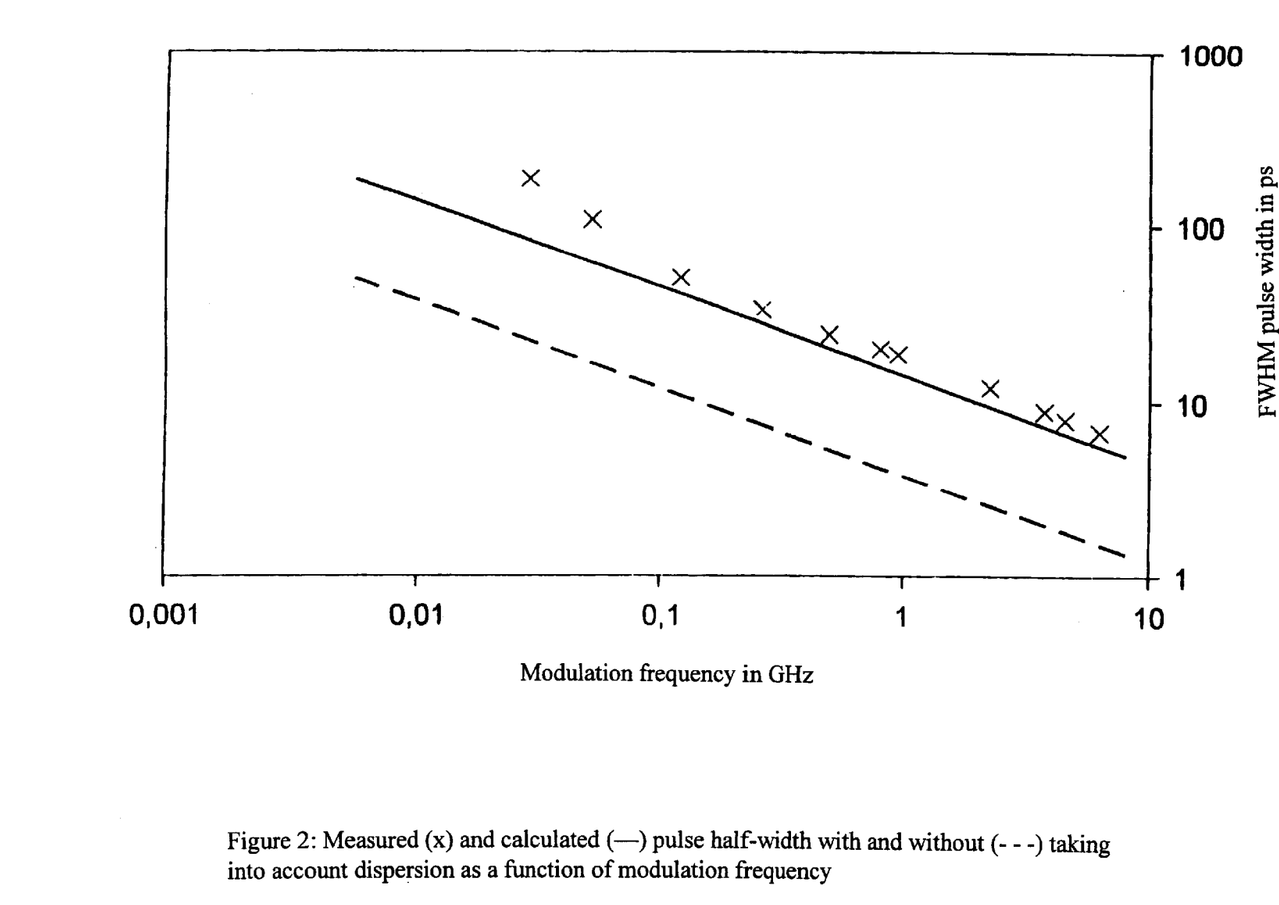
FIG. 2: the measured and calculated pulse half-width with and without taking into account dispersion as a function of modulation frequency.
Figure 3:
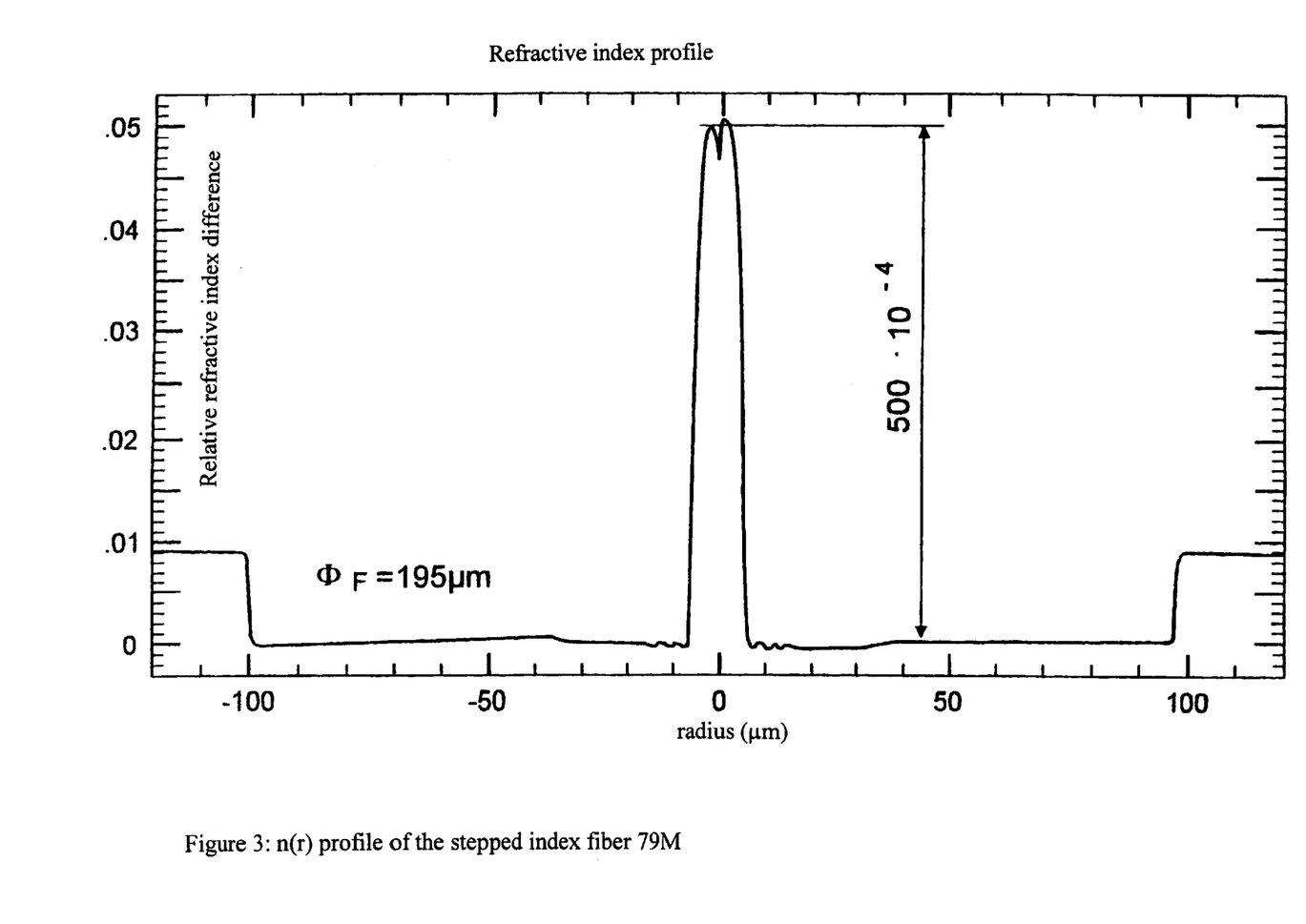
FIG. 3: an n(r) profile of the stepped index fiber 79 M.
Figure 4:
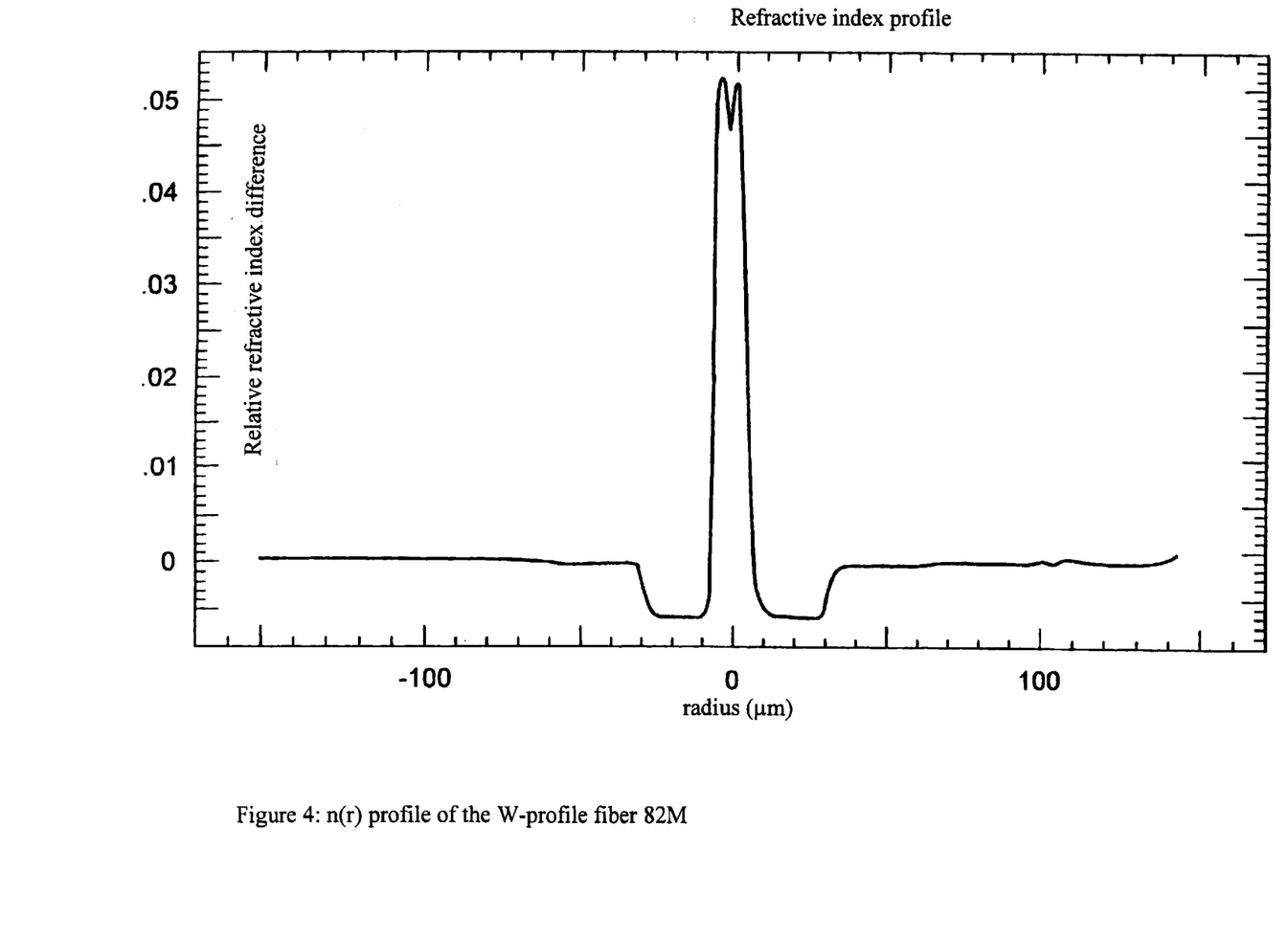
FIG. 4: an n(r) profile of the W-profile fiber 82 M.
Figure 5A:
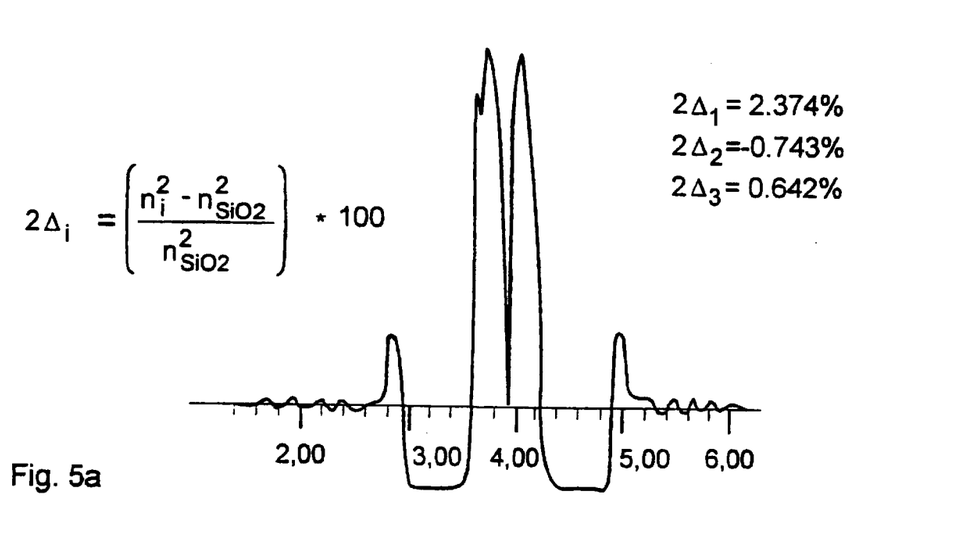
FIG. 5(a): a refractive index profile of the two TC profile fibers with a rectangular core, preform measurement.
Figure 5B:
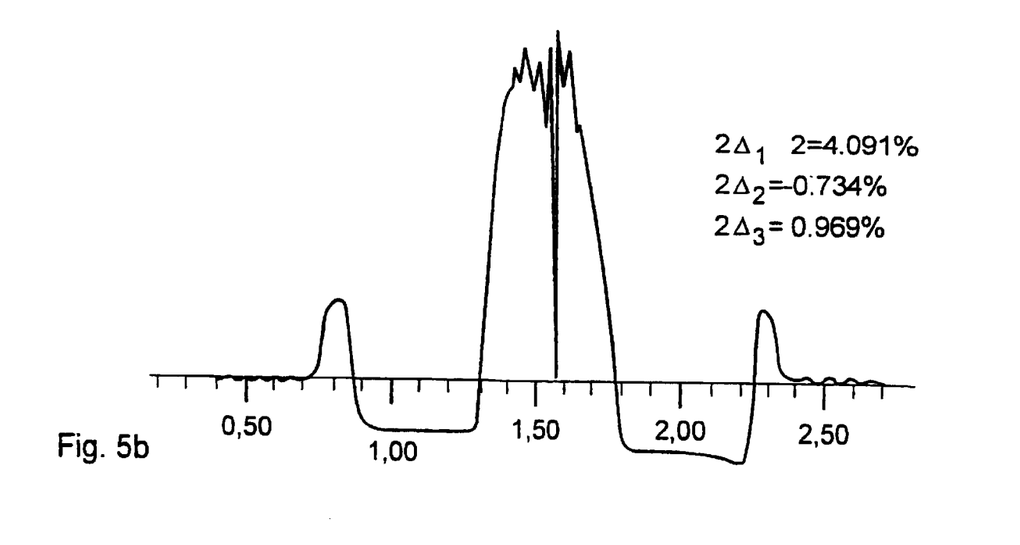
FIG. 5(b): a refractive index profile of the two TC profile fibers with a parabolic core; preform measurement.

FIG. 2 shows the negative influence of dispersion D on pulse half-width for the case of a $Pr^{3+}$ ZBLAN glass fiber laser. This means that D must disappear in order to minimize $\tau_p$, i.e., dispersion must be compensated. This can be accomplished by using a chirped fiber Bragg grating as the laser reflector, e.g., as the decoupling reflector. However, this method is very problematical. The reflecting power of the chirped fiber grating is precisely defined by optimizing the fiber laser and must thus be verified because otherwise the laser threshold is increased and the output power is reduced. To compensate for the dispersion of the active fibers the spectral half-width must be >10 nm according to estimates; otherwise $\tau_p$ is increased. These technological requirements cannot be met at the present time.

SUMMARY OF THE INVENTION

An object of the present invention is to permit a combination of the effects of dispersion compensation and definition of the linear polarization state in a glass fiber that has high birefringence of the DC fibers and is linked to the active fiber.

The present invention provides a dispersion compensation fiber for compensation of dispersion in a glass fiber, which is accommodated in the fiber laser resonator and linked to the active fiber, characterized in that it is formed by a selected doping in the preform and by a controlled elliptical shaping of the core for geometric birefringence which allows only the propagation of the two orthogonal linear polarization states, both for dispersion compensation as well as for definition of the linear polarization state.

BRIEF DESCRIPTION OF THE DRAWINGS

The present invention with its effects and advantages is explained in greater detail below on the basis of exemplary embodiments. The respective drawings and tables show.

Table 1: measurement results for the chromatic dispersion of the two PM-DC fibers 79 M and 82 M, measurements with the Raman fiber laser and the Mach-Zehnder interferometer.

Table 2: PMD, group birefringence and group beat length of two PM-DC fibers and three commercial PM fibers for comparison; and Table 3.

geometric data, attenuation, dispersion measurement results and PMD values of the two TC-profile fibers with a rectangular and parabolic core profile.

DETAILED DESCRIPTION

The present invention concerns DC fibers with a high birefringence, compensating for the dispersion of the active fibers as well as defining, fixing and controlling the polarization state of the radiation. These fibers are referred to below as PM-DC fibers.

This yields an all-fiber method of achieving the object according to the present invention with low resonator losses, because these PM-DC fibers have a low attenuation. Thus, a low laser threshold and high output power can be expected. In addition, a very compact design is guaranteed.

Dispersion compensation fibers with a high birefringence (PM-DC fibers) can be a very useful tool in optical measurement and sensor technology in cases where it is important to compensate for the chromatic dispersion of (active) glass fibers while at the same time defining, fixing and controlling the polarization status of the radiation. This is to be illustrated on the basis of an example.

The discussion below is limited to the $3^{rd}$ optical window (at λ=1550 nm). The high birefringence is achieved due to a marked ellipticity of the fiber core, which is called geometric birefringence.

Four fiber profiles which meet this requirement are described below. An iterative, inverse method was presented by R. Boness, W. Nowak, J. Vobian, S. Unger, J. Kirchhof in "Tailoring of dispersion-compensation fibers with high compensation ratios up to 30," *Pure Appl. Opt.* 5 (1995) 333, which makes it possible to determine the relevant fiber parameters and optimize the fiber profile for given dispersion values and Petermann II field radii. This method uses the Levenberg-Marquardt algorithm based on the Helmholtz equation and the singular Sturm-Liouville eigenvalue solution.

In the present case, the dispersion in the $3^{rd}$ optical window must assume high negative values.

Figure 6:
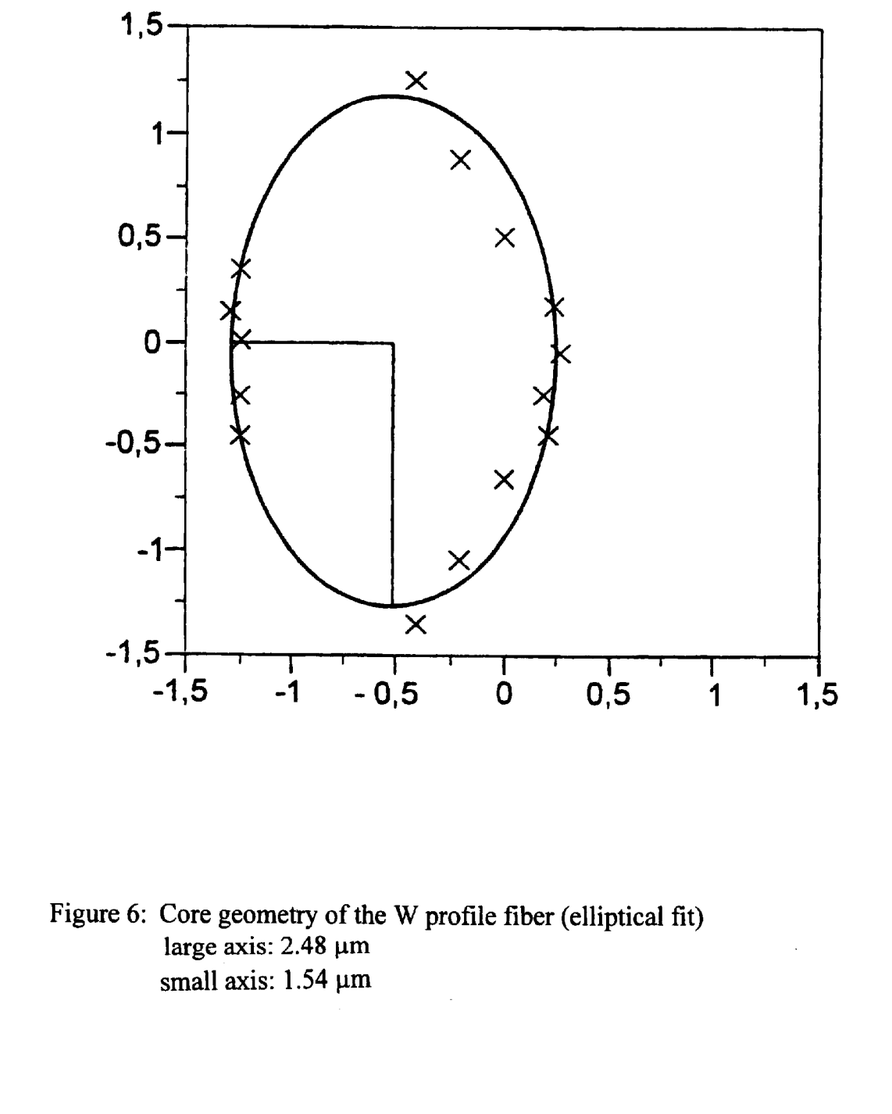
FIG. 6: a core geometry of the W-profile fiber (elliptical fit); large axis: 2.48 μm, small axis: 1.54 μm.

FIGS. 3, 4, 5(a) and 5(b) show the fiber profiles of a stepped index fiber, a W-profile fiber and two triple-clad (TC) fibers with rectangular and parabolic core profiles. FIG. 6 shows the geometry of the core of the W-profile fiber.

The measurements of chromatic dispersion D(λ) can be performed with a Raman fiber laser RFL, described in J. Vobian: Dispersionsmessungen zuri Charakterisierung von Quarzglasfasem der optischen Nachrichtentechnik. Mitteilungen aus dem Forschungsinstitut der Deutschen Bundespost [Dispersion measurements to characterize quartz glass fibers of optical communications technology. Reports from the Research Institute of the Federal German Post Office], No. 14 (1992), and the Mach-Zehnder interferometer MZI, described in J. Vobian: Chromatic and Polarization Dispersion Measurements of Single-Mode Fibers with a Mach-Zehnder Interferometer between 1200 and 1700 nm, *J. Opt. Commun.* 11 (1990), 1, p. 29.

The advantages of this measurement technique include the large measurement range of up to λ≧1700 nm, the large number of measurement points, the high measurement accuracy, the possibility of running through the λ spectrum continuously and without any gap, and in the case of the MZI, performing measurements on short pieces of fiber. It is readily possible to measure very high negative dispersion values in the $3^{rd}$ optical window in the case of RFL, in the case of MZI, this is also feasible with the help of modifications in the measurement setup.

Figure 7A:
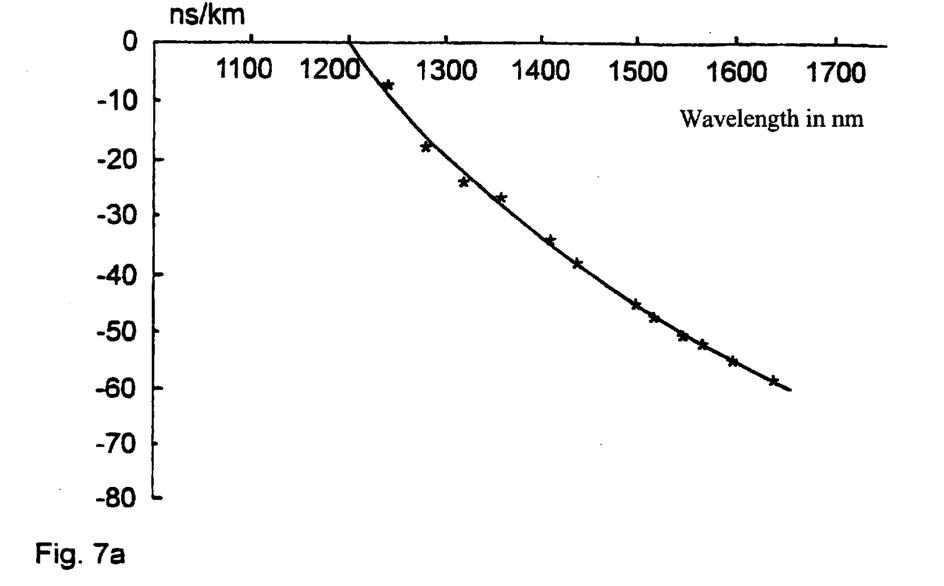
FIG. 7(a): a group transit time for the stepped index fiber 79 M.
Figure 7B:
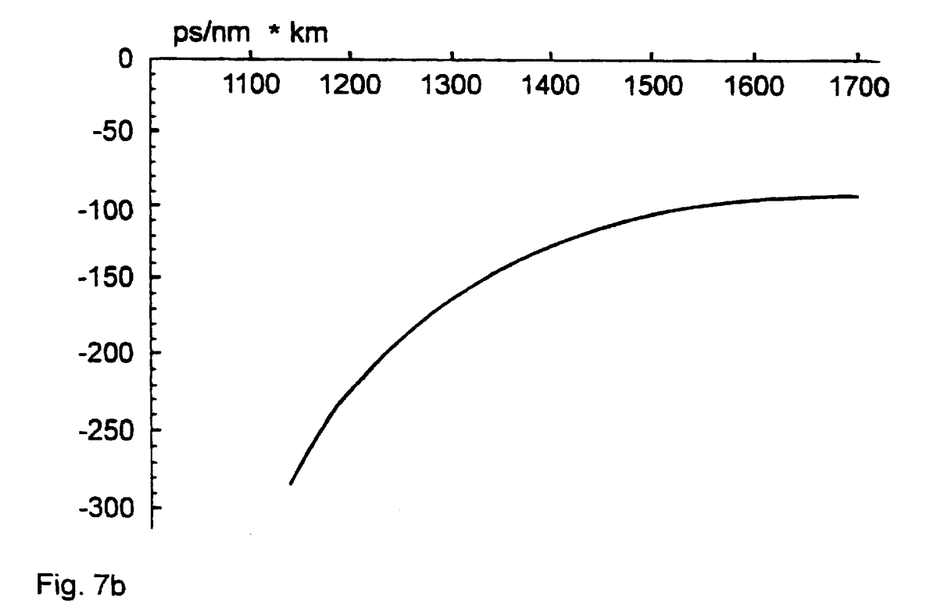
FIG. 7(b): a dispersion curve for the stepped index fiber 79M.
Figure 8:
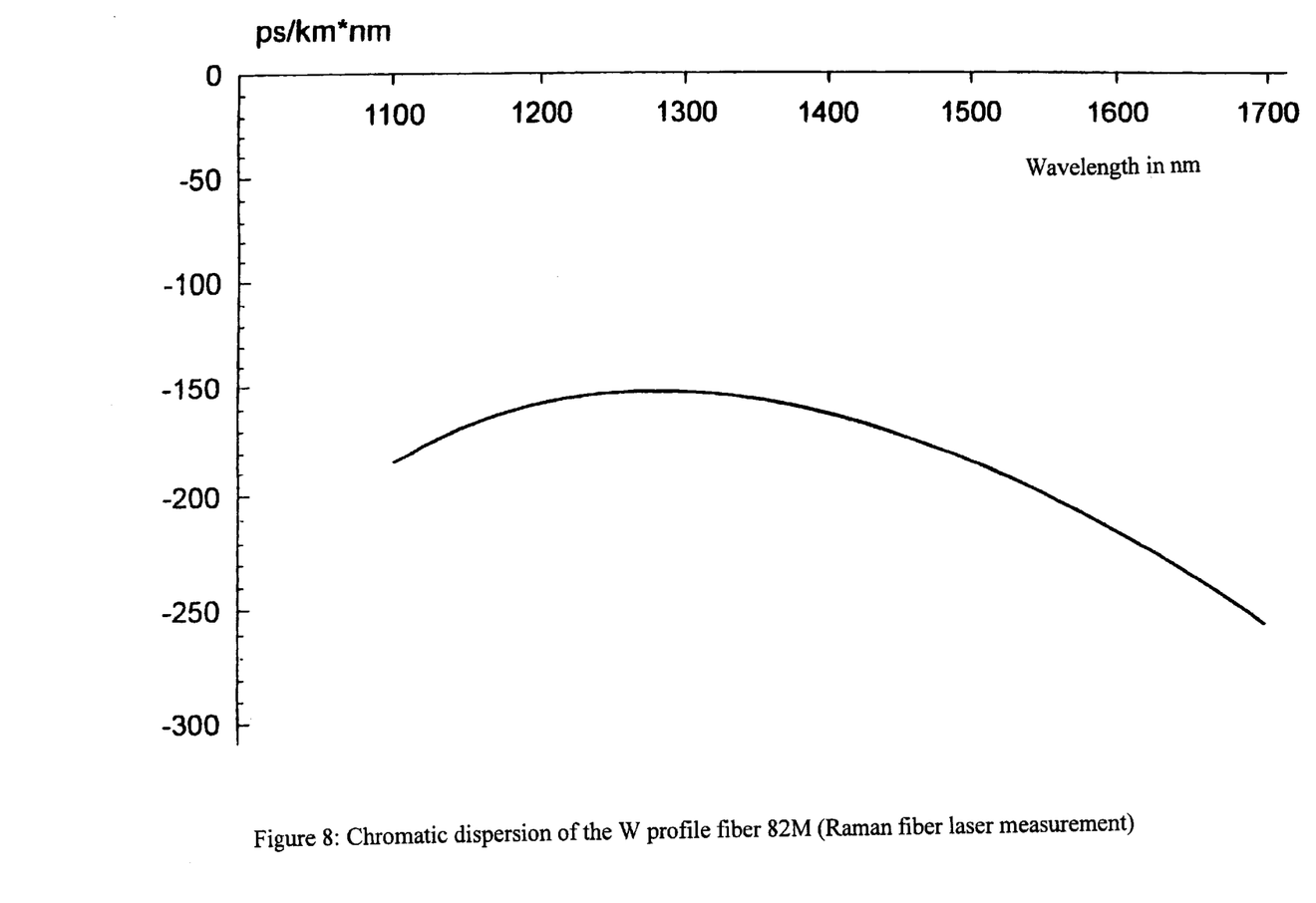
FIG. 8: the chromatic dispersion of the W-profile fiber 82 M in a Raman fiber laser measurement.
Figure 9A:
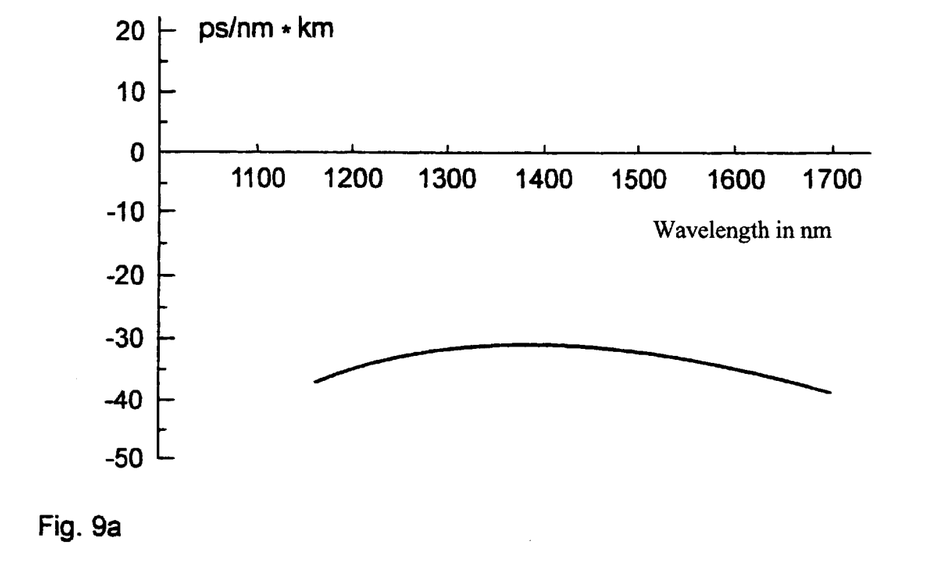
FIG. 9(a): the dispersion curves of the two TC-profile fibers 94 M and 96 M with a rectangular core.
Figure 9B:
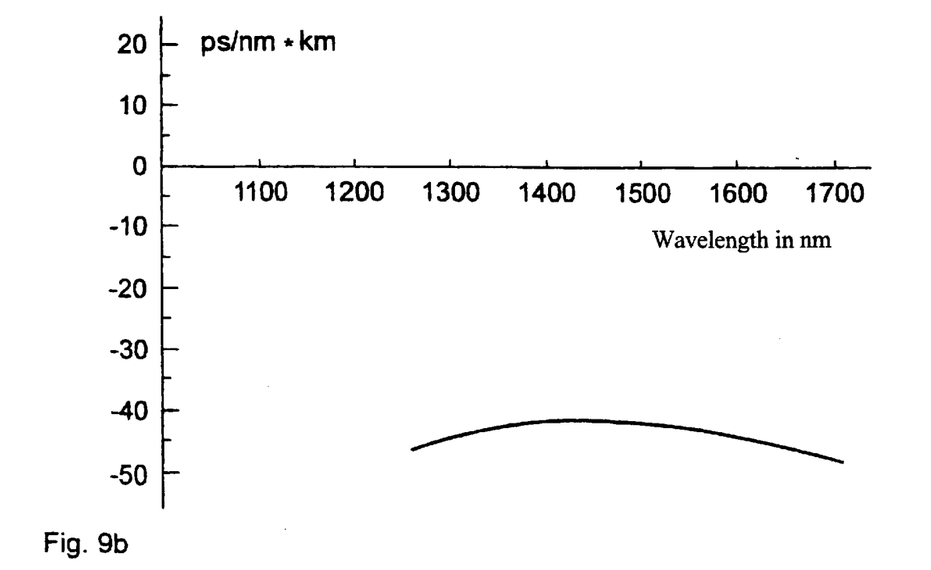
FIG. 9(b): the dispersion curve of the two TC-profile fibers 94M and 96M with a parabolic core.

FIGS. 7(a) and 7(b) show the group transit time curve and the dispersion curve for the stepped index fiber 79 M; FIG. 8 shows the dispersion curve of the W fiber 82 M, and FIGS. 9(a) and 9(b) show the dispersion curves of the two TC fibers 94 M and 96 M. Table 1 gives the relevant data on the two fibers 79 M and 82 M. The deviations between RFL and MZI measurements can be explained by fiber inhomogeneities.

Table 3 summarizes the geometry and dispersion data on the two TC fibers 94M and 96M. The birefringence values will be discussed later.

The measurements of birefringence and polarization mode dispersion (PMD) are performed in the time domains with a Michelson interferometer, as described by N. Gisin, J. -P. Von der Weid, J. -P. Pellaux in: Polarization Mode Dispersion of Short and Long Single-Mode Fibers. *J. Lightw. Technol.* 9 (1991) 7, p. 821, and by J. Vobian, K. M öřl, W. Keilig in: Different aspects of the polarization mode dispersion measuring technique. *Proc. EFOG&N 94*, Heidelberg 1994, p. 174.

Figure 10:
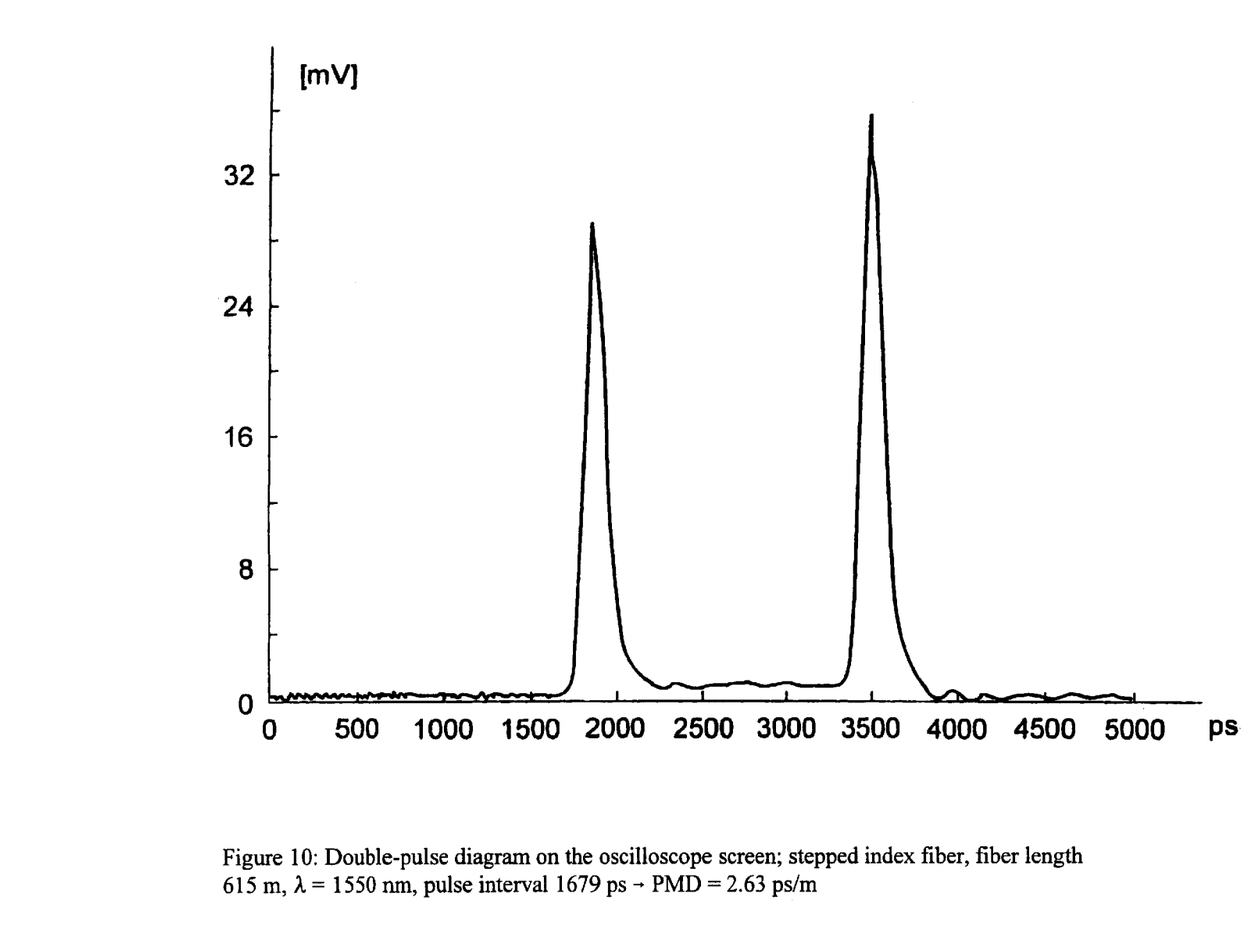
FIG. 10 a double-pulse diagram on an oscilloscope screen; pulses of a stepped index fiber, fiber length 615 m, λ=1550 nm, pulse interval 1679→PMD=2.63 ps/m.

FIG. 10 shows how the pulses are splintered due to the high birefringence causing high PMD values. The interval between the two pulses is a measure of the birefringence of the fibers. Table 2 summarizes the measurement results for fibers 79 M and 82 M. It also gives the corresponding data on commercial fibers that maintain polarization (HiBi) for comparison purposes (PANDA, YORK bow-tie and AT&T fibers). It can be seen here that the birefringence of the two fibers 79 M and 82 M with elliptical cores is much higher, and the beat lengths are correspondingly smaller. The relationships between group birefringence $B_G$, group length $l_G$ and polarization mode dispersion PMD ($\Delta\tau_{GP}$) are shown below:

$$\Delta\tau_{GP} = \frac{\Delta t_{GP}}{L} = \frac{B_G}{c}, \quad l_G = \frac{\lambda}{B_G}.$$

Table 2 also shows, as already mentioned, the measured birefringence and PMD values for the two TC fibers. Both the dispersion values and the birefringence and PMD values are smaller for the two TC fibers than for the stepped index and W fibers. That was intentional, because this information is completely sufficient, but in addition, the attenuation values of the two TC fibers are much lower, which has a positive effect on laser operation, as mentioned above.

TABLE 1

Measurement results for chromatic dispersion of the two PM-DC fibers 79M and 82M

| PM-DC fiber | Measurement setup | D (1300 nm) in ps/km · nm | D (1540 nm) in ps/km · nm | D (1550 nm) in ps/km · nm | Elliptical fit large/small axis |
|---|---|---|---|---|---|
| W fiber 82M | Raman fiber laser | −150.7 | −194.7 | −197.8 | 2.48/1.54 µm |
| W fiber 82M | Mach Zehnder interferometer | −148.3 | −192.2 | −195.3 | |
| Stepped index fiber 79M | Raman fiber laser | −160.5 | −105.0 | −102.2 | 2.24/1.26 µm |
| Stepped index fiber 79M | Mach- Zehnder interferometer | −154.8 | −101.2 | −98.8 | |

TABLE 2

PMD, group birefringence and group beat length of two PM-DC fibers and of three commercial PM fibers for comparison

| Parameter | Fiber | Wavelength in nm | | | |
| | | 1276 | 1321 | 1516 | 1546 |
|---|---|---|---|---|---|
| PMD in ps/m | W fiber 82M | 5.64 | 5.91 | 8.68 | 8.89 |
| | Stepped index fiber 79M | 3.34 | 3.28 | 2.67 | 2.56 (2.63) |
| | PANDA fiber | | 1.44 | 1.47 | — |
| | YORK bow-tie fiber | | 2.18 | 2.22 | — |
| | AT&T PM fiber | | 0.77 | 0.78 | — |
| Group birefringence $B_G · 10^{-4}$ | W fiber 82M | 16.92 | 17.73 | 26.04 | 26.67 |
| | Stepped index fiber 79M | 10.02 | 9.84 | 8.01 | 7.68 |
| | PANDA fiber | | 4.32 | 4.40 | — |
| | YORK bow-tie fiber | | 6.54 | 6.66 | — |
| | AT&T PM fiber | | 2.30 | 2.35 | — |
| Group beat length in nm | W fiber 82M | 0.75 | 0.75 | 0.58 | 0.58 |
| | Stepped index fiber 79M | 1.27 | 1.34 | 1.89 | 2.01 |
| | PANDA fiber | | 3.01 | 3.42 | — |
| | YORK bow-tie fiber | | 1.97 | 2.25 | — |
| | AT&T PM fiber | | 5.58 | 6.46 | — |

TABLE 3

Geometric data, attenuation, dispersion measurement results and PMD values for the two TC profile fibers with a rectangular core and a parabolic core

| | DC fiber 94M | DC fiber 96M |
|---|---|---|
| a in μm | 5.2 | 5.56 |
| $r_1$ in μm | 1.46 | 1.52 |
| $r_2$ in μm | 4.43 | 4.75 |
| α (1300 nm) dB/km | 2.0 | 4.6 |
| α (1550 nm) dB/km | 1.3 | 2.7 |
| D (1300 nm) ps/km · nm | −33.9 | −43.0 |
| D (1550 nm) ps/km · nm | −40.0 | −41.9 |
| S (1550 nm) ps/km · nm$^2$ | −0.0264 | −0.0129 |
| PMD (3121 nm) in ps/m | 0.24 | 0.62 |
| $B_G$ (1321) $10^{-4}$ | 0.72 | 1.86 |
| $l_{BG}$ (1321) in cm | 1.83 | 0.71 |
| PMD (1546) in ps/m | 0.36 | 0.89 |
| $B_G$ (1546) $10^{-4}$ | 1.08 | 2.65 |
| $l_{BG}$ (1546) in cm | 1.43 | 0.58 |

What is claimed is:

1. A method of making a dispersion compensation fiber for compensation of dispersion in a glass fiber, the method comprising:

controlling elliptical shaping of a core of the dispersion compensation fiber for geometric birefringence so that a refractive index profile allows only propagation of two orthogonal and linear polarization states and in order to achieve a dispersion compensation and a definition of the linear polarization states; and determining the refractive index profile in accordance with the elliptical shaping and in accordance with a selected doping of a preform of the dispersion compensation fiber, wherein the refractive index profile is designed for high negative dispersion values in an optical window at around about 1550 nm as well as high positive dispersion values in another optical window at around about 1300 nm with regard to waveguide and material dispersion, in order to be able to compensate dispersion of active fibers in both the optical window and the another optical window and fix the polarization state.

* * * * *